United States Patent [19]

De La Mare et al.

[11] 4,389,515

[45] Jun. 21, 1983

[54] CURABLE POLYEPOXIDE-UNSATURATED MONOMER COMPOSITIONS SUITABLE FOR USE IN RIM PROCESSES

[75] Inventors: Harold E. De La Mare; Thomas F. Brownscombe, both of Houston, Tex.

[73] Assignee: Shell Oil Company, Houston, Tex.

[21] Appl. No.: 330,414

[22] Filed: Dec. 14, 1981

[51] Int. Cl.$^3$ ............................................. C08L 63/10
[52] U.S. Cl. ................................. 525/420.5; 523/456; 525/407; 525/532
[58] Field of Search ................ 523/456; 525/407, 532, 525/420.5

[56] References Cited

U.S. PATENT DOCUMENTS

| | | | |
|---|---|---|---|
| 2,450,940 | 10/1948 | Cowan et al. | 260/404.5 |
| 2,633,458 | 3/1953 | Shokal | 260/45.2 |
| 3,188,362 | 6/1965 | Delmonte | 525/532 |
| 3,336,241 | 8/1967 | Shokal | 260/2 |
| 3,373,221 | 3/1968 | May | 260/837 |
| 3,377,406 | 4/1968 | Newey et al. | 260/837 |
| 3,431,237 | 3/1967 | Harry | 525/407 |
| 3,492,269 | 1/1970 | Janssen et al. | 260/47 |
| 4,026,858 | 5/1977 | Andrews | 523/456 |
| 4,125,503 | 11/1978 | McCarty | 523/456 |

*Primary Examiner*—Paul Lieberman
*Attorney, Agent, or Firm*—Norris E. Faringer

[57] ABSTRACT

The present invention provides a rapid curing epoxy composition suitable for RIM processes which exhibits unexpectedly good physical properties which comprises (1) an epoxy resin, (2) at least one ethylenically unsaturated monomer, (3) a polyamine or polyamide, (4) a catalyst selected from Group I or Group II metal salts, and (5) a polyalkylene ether glycol.

17 Claims, No Drawings

CURABLE POLYEPOXIDE-UNSATURATED MONOMER COMPOSITIONS SUITABLE FOR USE IN RIM PROCESSES

BACKGROUND OF THE INVENTION

This invention is directed to curable high modulus epoxy reaction injection molding (RIM) compositions. The invention further relates to the manufacture of molded articles by reaction injection molding of catalyzed epoxy-polyamine compositions.

The use of urethane technology in RIM systems is well-known. In RIM technology the mixed urethane foam ingredients are injected into a mold cavity through a runner and a gate at low pressure, usually about 20 psi, where they react quickly to produce molded articles. Large parts can thusly be produced very quickly at relatively low mold pressures. Such elastomers normally comprise the reaction product of an aromatic polyisocyanate, a polyol and a chain extending agent.

Molding compositions of epoxy resins on the other hand are usually prepared by placing an epoxy composition comprising an epoxy resin and curing agent in a suitable mold, with or without reinforcement, and curing the composition under pressure and elevated temperature. These cured epoxy compositions exhibit good physical and chemical properties. It would be desirable; however, to be able to produce cured articles faster from epoxy compositions which exhibit physical and mechanical properties which are equal or superior to standard casting resins.

U.S. Pat. No. 3,492,269 is directed to a process for hardening epoxy resins using certain inorganic metal salt accelerators such as NaCl or NaBr, for the curing of said epoxy resins. These cured compositions cannot be used in RIM applications because of the relatively slow gel times. See, for example, Example 3 wherein gel times are in excess of 32 minutes. Further, although oxygenated organic solvents are disclosed as solvents for the metal salts, their use in said to be generally unnecessary.

An epoxy composition was discovered which exhibits a high modulus (ca 400,000 psi) and high strength (ca 10,000 psi) when produced via RIM techniques. This novel and useful composition is disclosed and claimed in copending patent application Ser. No. 330,413, filed Dec. 14, 1981.

It has now been found that the compositions of Ser. No. 330,413 can be modified by the addition of a miscible amount of at least one ethylenically unsaturated monomer. Accordingly, the present invention provides a curable polyepoxide-ethylenically unsaturated monomer composition containing a special amine/peroxide/polyalkylene glycol curing combination which when cured exhibits improved physical properties and is especially suitable for use in RIM and pressure gelation molding processes.

SUMMARY OF THE INVENTION

The present invention is directed to novel compositions wherein a polyalkylene glycol is used in combination with special amines and selected metalic salts to cure an epoxy/ethylenically unsaturated monomer blend in a RIM process. It was unexpectedly discovered that this special combination produces mechanical properties equivalent to those of traditional cure techniques yet can be cured extremely fast (one to ten minutes). Further, the mechanical properties attained at high temperatures may be obtained at low temperatures more quickly with the instant curing-promoter system.

Accordingly, the present invention provides a rapid curing epoxy composition, suitable in RIM processes, which exhibits unexpectedly high modulus and high strength which comprises (1) an epoxy resin, (2) at least one ethylenically unsaturated monomer, (3) a polyamine, (4) a catalyst selected from the Group I and Group II salts, and (5) a polyalkylene ether glycol.

DESCRIPTION OF THE PREFERRED EMBODIMENTS

The present invention provides a rapid curing, storage stable, thermosetting composition which is especially suitable for use in RIM processes and which, when cured, exhibits unexpectedly high modulus strengths, comprising (1) 100 parts by weight of an epoxy compound containing more than one vicinal epoxy group,
(2) a miscible amount, i.e., from about 10 to about 200 parts by weight of at least one ethylenically unsaturated monomer,
(3) a curing amount of an amino compound containing at least three amino hydrogens (—NH groups), and preferably is a cycloaliphatic diamine,
(4) a catalytic amount of a Group I (alkali metal) or Group II (alkaline earth metal) metal salt selected from the group consisting of nitrates, iodides, thiocyanates, alkoxides, and perchlorates, and
(5) a polyalkylene ether glycol.

Polyepoxides

Suitable polyepoxides used to prepare the present compositions comprise those compounds containing at least one vicinal epoxy or oxirane group, i.e., at least one

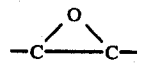

group. These polyepoxides may be saturated or unsaturated, aliphatic, cycloaliphatic, aromatic or heterocyclic and may be substituted if desired with non-interfering substituents such as halogen atoms, hydroxyl groups, ether radicals, and the like. They may also be monomeric or polymeric.

For clarity, many of the polyepoxides and particularly those of the polymeric type are described in terms of epoxy equivalent values. The meaning of this expression is described in U.S. Pat. No. 2,633,458. The polyepoxides used in the present process are preferably those having an epoxy equivalency greater than 1.0.

Various examples of liquid polyepoxides that may be used in the process of the invention are given in U.S. Pat. No. 2,633,458 and it is to be understood that so much of the disclosure of that patent relative to examples of polyepoxides is incorporated by reference into this specification.

Other suitable polyepoxides are disclosed in U.S. Pat. Nos. 3,373,221 and 3,377,406 and so much of the disclosure relevant to examples of epoxy compounds is incorporated by reference into this specification.

Preferred polyepoxides are the glycidyl polyethers of polyhydric phenols and polyhydric alcohols, especially the glycidyl polyethers of 2,2-bis(4-hydroxyphenyl)propane having an average molecular weight between about 300 and 3,000 and an epoxide equivalent weight between about 140 and 2,000.

Other suitable epoxy compounds include those compounds derived from polyhydric phenols and having at least one vicinal epoxy group wherein the carbon-to-carbon bonds within the six-membered ring are saturated. Such epoxy resins may be obtained by at least two well-known techniques, i.e., by the hydrogenation of glycidyl polyethers of polyhydric phenols or (2) by the reaction of hydrogenated polyhydric phenols with epichlorohydrin in the presence of a suitable catalyst such as Lewis acids, i.e., boron trihalides and complexes thereof, and subsequent dehydrochlorination in an alkaline medium. The method of preparation forms no part of the present invention and the resulting saturated epoxy resins derived by either method are suitable in the present compositions.

Briefly, the first method comprises the hydrogenation of glycidyl polyethers of polyhydric phenols with hydrogen in the presence of a catalyst consisting of rhodium and/or ruthenium supported on an inert carrier at a temperature below about 50° C. This method is thoroughly disclosed and described in U.S. Pat. No. 3,336,241, issued Aug. 15, 1967.

The hydrogenated epoxy compounds prepared by the process disclosed in U.S. Pat. No. 3,336,241 are suitable for use in the present compositions. Accordingly, the relevant disclosure of U.S. Pat. No. 3,336,241 is incorporated herein by reference.

The second method comprises the condensation of a hydrogenated polyphenol with an epihalohydrin, such as epichlorohydrin, in the presence of a suitable catalyst such as BF$_3$, followed by dehydrohalogenation in the presence of caustic. When the phenol is Bisphenol A, the resulting saturated epoxy compound is sometimes referred to as "diepoxidized hydrogenated Bisphenol A", or more properly as the diglycidyl ether of 2,2-bis(4-cyclohexanol)propane.

In any event, the term "saturated epoxy resin", as used herein shall be deemed to mean the glycidyl ethers of polyhydric phenols wherein the aromatic ring structure of the phenols have been or are saturated.

An idealized structural formula representing the preferred saturated epoxy compounds is as follows:

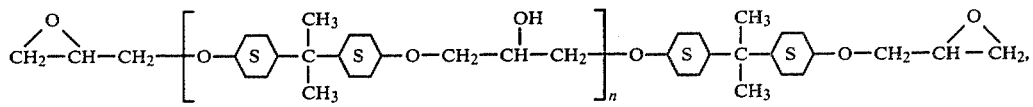

wherein n has a value so that the average molecular weight of the saturated polyepoxide is from about 350 to about 3,000.

Preferred saturated epoxy resins are the hydrogenated resins prepared by the process described in U.S. Pat. No. 3,336,241. More preferred are the hydrogenated glycidyl ethers of 2,2-bis(4-hydroxyphenyl)propane, sometimes called the diglycidyl ethers of 2,2-bis(4-cyclohexanol)propane.

Other examples include the glycidyl novolac resins, i.e., phenolaldehyde condensates, as described in U.S. Pat. No. 2,658,885.

An exceptionally suitable polyepoxide comprises a blend of (a) a diglycidyl ether of 2,2-bis(4-hydroxyphenyl)propane and (b) a diglycidyl ether of hydrogenated 2,2-bis(4-hydroxyphenyl)propane. In general, the blend will vary on a weight basis of a:b of from about 50:50 to about 80:20, with a 75:25 blend being preferred.

Ethylenically Unsaturated Monomers

The preferred ethylenically unsaturated monomers are the unsaturated aromatic monomers such as styrene, alpha-methyl styrene; halo-substituted styrenes such as chlorostyrene; nitro-substituted styrenes such as nitrostyrene; alkyl-substituted styrenes such as tertiary-butyl styrene; divinylbenzene, vinyl toluene; 2-vinyl pyridine; N-vinyl pyrrolidone, and vinyl naphthalene. Especially preferred is styrene.

Other suitable monomers which are preferably blended with styrene include, (1) esters of ethylenically unsaturated carboxylic acids, (2) cyano-containing unsaturated compounds, (3) allyl-containing compounds, and (4) olefins or diolefins and (5) alkyl phenols.

Suitable unsaturated monocarboxylic acid esters include the alkyl esters of ethylenically unsaturated acids such as acrylic acid, methacrylic acid, crotonic acid, alpha-phenylacrylic acid, alpha-cyclohexylacrylic acid, maleic acid, alpha-chloromaleic acid, itaconic acid, citraconic acid, fumaric acid, cyanoacrylic acid, methoxyacrylic acid, and the like. Very preferred acids are acrylic acid and methacrylic acid. Accordingly, suitable such esters include, methyl methacrylate, ethyl acrylate, butyl acrylate, butyl methacrylate, isobutyl methacrylate, pentaerythritol triacrylate, trimethylolpropane trimethacrylate, and the like.

Suitable cyano-compounds include acrylonitrile and methacrylonitrile.

Suitable allyl monomers include diallyl phthalate and triallyl isocyanurate.

Suitable phenols include nonyl phenol and lower and higher homologues, and alkylated bisphenol acetone or other diphenols. Other suitable comonomers include the unsaturated aliphatic compounds such as the olefins and diolefins. Operable such olefins and diolefins include ethylene, propylene, butylene, amylene, butadiene, isoprene, vinyl hexane, vinyl cyclohexanes, vinyl cyclopentane, vinyl cyclopentene, norbornadiene, cyclopentadiene, cyclopentadiene dimer and the like. It will be appreciated that since some of these monomers are normally gases at ambient temperatures and pressures, their use dictates that the compositions be formulated and cured under pressure conditions. Accordingly, their use is especially useful in the so-called reaction injection molding (RIM) techniques.

As noted hereinbefore, the resinous portion of the composition comprises a miscible amount of polyepoxide and ethylenically unsaturated monomer, usually a blend of a 100 parts by weight polyepoxide and from about 10 to about 200 parts by weight of at least one ethylenically unsaturated monomer. If desired, any of the above defined monomers may be used singly or in blends with one or more comonomers. Compositions exhibiting improved properties comprise a major proportion of an aromatic unsaturated monomer such as styrene.

Amino-Containing Compounds

Suitable amino-containing curing agents comprise the aliphatic and cycloaliphatic polyfunctional amines and the polyamides.

Suitable polyfunctional amines may have the following general structure:

$$NH_2-R+NH-R\}_{\overline{x}}NH_2$$

wherein each R is an alkyl, aryl or alkaryl radical of up to about 8 carbon atoms and x has a value of from about 0 to about 10, and preferably 1 to 3.

Examples of suitable such polyfunctional amines include, among others, diethylenetriamine and

$$H_2N-CH_2-CH_2-NH-CH_2-CH_2-NH_2,$$

as well as cycloaliphatic amines such as diaminocyclohexane and

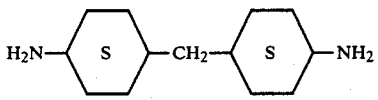

Very suitable polyfunctional amines are the polyoxypropyleneamines (aliphatic, terminally-branched, primary di- and tri-amines, structurally derived from polypropylene glycols and triols) commercially available under the trade designation "JEFFAMINE". A typical structure is as follows:

$$H_2N-CH(CH_3)CH_2\{OCH_2CH(CH_3)\}_{\overline{x}}NH_2 \quad (1)$$

wherein x has an approximate value of from about 2.5 to about 3.5.

Polyamides which are suitable for use in the present compositions may be saturated or unsaturated as well as monomeric or polymeric.

Polyamides which are especially useful in the present compositions are those derived from polymeric fatty acids and aliphatic polyamines. Polyamides of this type are disclosed in U.S. Pat. No. 2,450,940. Typically, these polyamides are those made from polymeric fatty acids containing up to about 22 carbon atoms in the monomeric acid with ethylene diamine and/or diethylene triamine. It will be appreciated that polyamide resins having terminal amine groups or terminal carboxyl groups or in which some of the terminal groups are amine groups while others are carboxyl groups.

The polymeric fatty acids employed in preparing the polyamides are those resulting from the polymerization of drying or semi-drying oils, or the free acids or simple aliphatic alcohol esters of such acids. Suitable drying or semi-drying oils include soybean, linseed, tung, perilla, oiticia, cottonseed, corn, tall, sunflower, safflower, dehydrated castor oil, and the like. In the polymerization process for the preparation of the polymeric fatty acids, the fatty acids with sufficient double bond functionality combine for the most part, probably by a Diels Alder mechanism, to provide a mixture of dibasic and higher polymeric acids. The acids with insufficient functionality to react remain as monomers and may be wholly or partially removed, for example by distillation. The residue after distillation consists of the desired polymeric acids and this mixture is used for the preparation of the polyamide resin. In place of this method of polymerization, any other method of polymerization may be employed whether the resultant polymer possesses residual unsaturation or not. The term "polymeric fatty acids" as used herein, is intended to include the polymerized mixture of acids obtained, which mixture usually contains a predominant portion of dimeric acids, a smaller quantity of trimeric and higher polymeric acids, and some residual monomer.

These polymeric fatty acids may be reacted with a variety of aliphatic polyamines for the production of the polyamide. The amidification reaction may be carried out under the usual conditions employed for this purpose, as will be evident from the examples. Polyamides of this type generally have molecular weights varying from 1,000 to 10,000 and are resistant to the corrosive action of water, alkali, acids, oils, greases, and organic solvents. The melting points vary, depending upon the reactants and the reaction conditions. Where aliphatic diamines, such as ethylene diamine, are employed for the preparation of the polyamide the resin may melt within the approximate range of 100°–120° C., and usually within the range of 100°–105° C.

Higher melting polyamide resins, for example melting within the range of 130°–215° C., may be made by employing a mixture of polymeric fatty acids and other polybasic acids, the latter having at least two carboxyl groups which are separated by at least 3 and not more than 8 carbon atoms. Typical of these polybasic acids are the aliphatic acids, glutaric, adipic, pimelic, suberic, azelaic, and sebacic, and the aromatic acids, terephthalic, and isophthalic acids. The melting point of the copolymer resin may vary within the range previously indicated, depending upon the particular reactants, relative ratios thereof, as well as the reaction conditions.

Low melting polyamide resins melting within the approximate range of 25°–90° C. may be prepared from polymeric fatty acids and aliphatic polyamines having at least 3 atoms invervening between the amine groups principally involved in the amidification reaction. These three atoms may be carbon atoms or hetero atoms. Typical of the polyamines which may be used are diethylene triamine, triethylene tetramine, tetraethylene pentamine, 1,4-diaminobutane, 1,3-diaminobutane, hexamethylene diamine, 3-(N-isopropylamino)-propylamine, 3,3'-imino-bispropylamine, and the like. A preferred group of these low melting polyamides are derived from polymeric fatty acids, and diethylene triamine and are liquid at room temperature.

Suitable such polyamides are commercially available under the trade designation of VERSAMID ® Polyamide resins and are amber-colored polyamides having a molecular weight ranging from about 3,000 to about 10,000 and a softening point from about below room temperature to 190° C. and prepared by condensing polymerized unsaturated fatty acids (e.g., dilinoleic acid) with aliphatic polyamines such as diethylene triamine.

The preparation of such VERSAMID ® polyamide resins is well-known and by varying the acid and/or the functionality of the polyamine, a great variety of viscosities, molecular weights and levels of active amino groups spaced along the resin molecule can be obtained. Typically, the VERSAMID ® polyamide resin have amine values from about 50 to 400; Gardner color (max.) of 8–10; and viscosities of from about 1 to 30 poises.

Polyamines which are especially suitable in the present compositions are those wherein the NH functionality is ≧3 and contain active hydrogens.

Although useful for some applications, the polyamides are not preferred; however, blends of polyamides with polyamines are more suitable. Preferred polyamines are the aliphatic and cycloaliphatic amines, especially the cycloaliphatic diamines, such as

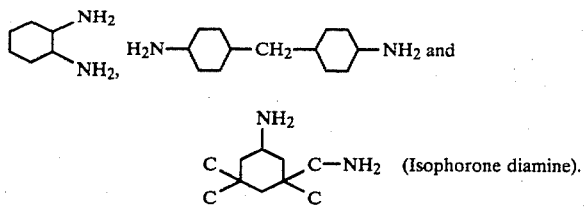

(Isophorone diamine).

The amount of polyamine or polyamide employed will vary somewhat, but will be a curing amount. In general, the amount of polyamine will be that amount required to furnish one amino hydrogen per epoxy group (stoichiometric amount), although up to about 50% excess of polyepoxide may be employed and up to about 100% excess of polyamine or polyamide may be employed.

Catalyst

Suitable catalysts which are operable in the present compositions include the Group I and Group II metal salts wherein the anion is selected from nitrates, iodides, thiocyanates, alkoxides and perchlorates, and sulfonates with the nitrates, iodides, thiocyanates and sulfonates being preferred.

The preferred Group I metal (cation) is lithium and the preferred Group II metals are calcium and magnesium with calcium being especially preferred.

Accordingly, preferred catalyst salts are lithium iodide, lithium nitrate, calcium nitrate, calcium perchlorate and magnesium nitrate. Excellent results are obtained with calcium nitrate.

In general, a catalytic amount of salt is employed. For most applications, the catalyst will be used from about 0.05 to about 5.0 parts by weight per 100 parts by weight of polyepoxide (phr), with from 0.1 to 3.0 phr being preferred and from about 0.25 to about 1.0 phr being especially preferred.

Free-Radical Initiator

As stated hereinbefore, an effective amount of an amine-compatible free-radical initiator is employed.

As used herein, the term "amine-compatible" is deemed to mean essentially no reaction between the selected amine or polyamide and the selected peroxide. A simple test comprises mixing the amine preferably in the presence of the resin with the peroxide at a temperature below the decomposition temperature of the peroxide. If there is no appearance of an odor or color, or any other evidence, e.g., spectroscopic, of decomposition, then the peroxide is said to be "amine-compatible".

Particularly preferred peroxides are the sterically hindered peroxyesters such as tertiary-butyl peroxybenzoate, 2,5-dimethyl-2,5-bis(2-ethyl hexanoylperoxy)-hexane, t-butyl peroxy neodecanoate, t-butyl peroxy pivalate, t-butyl peroctoate, t-butyl peroxy isobutyrate, t-butyl peroxy maleic acid and t-cumylperoxy neodecanoate and dialkyl peroxides such as di-tertiary-butyl peroxide, di-tertiary-butyl-2,5-dimethyl-2,5-peroxyhexane.

Peroxides which were found to be essentially unsuitable include benzoyl peroxide, hydroperoxides such as tertiary-butylhydroperoxide, methyl ethyl ketone peroxide, acetone peroxide and hydrogen peroxide.

In general, the amount of peroxide employed will range widely, but will be in an amount which is sufficient to effect the desired cure or crosslinking. Preferably, the amount of peroxide will vary from about 0.25% to about 15% based on the unsaturated monomer.

The selection of the amine and the peroxy compound should preferably be one wherein the particular amine tends to start the cure of the epoxy groups before the peroxide initiates the vinyl polymerization at the temperatures employed.

The other preferred component is a stabilizer/solvent composition which comprises a polyalkylene glycol or polyalkylene ether glycol having an average molecular weight between about 200 and about 1500 and is preferably a polyethylene glycol or polypropylene glycol having an average molecular weight between about 400 and 1000.

The amount of polyalkylene glycol will vary somewhat depending upon the particular epoxy resin, aliphatic amine, and/or metallic salt; however, the amount will generally be, on a weight ratio of polyalkylene glycol to metallic catalyst of from about 1:3 to about 2:1. Expressed another way, the polyalkylene glycol may be employed in amount ranging from about 0.1 to about 3 phr based in epoxy resin.

As noted herein before, the present compositions are especially adapted to RIM techniques because of the rapid curing possibility. Accordingly their use in RIM systems will be described as a preferred embodiment.

In general, RIM techniques and equipment are well known and need not be described in detail herein.

Simply, the epoxy resin-unsaturated monomer blend, containing the metallic salt, peroxide, and polyalkylene glycol, are mixed and added to the resin reservoir of a RIM apparatus. The polyamine and remaining unsaturated monomer is added to the Curative reservoir. In general, the resin mixture is maintained at about 25° to about 70° and the curative (polyamine) is brought to about 20° to about 50° C. The temperatures are representative and typical only and the temperature range may be expanded according to to the particular components employed. The resin change and curative charge are usually thoroughly degassed before processing. Then by means of a dispersing and metering means, the two streams from the reservoir are brought under high pressure into a mixing head (500 to 3000 psi, preferably about 500 to 1500 psi). The mix head is opened on a predetermined signal and the two streams flow together under turbulent mixing conditions and flow directly into the mold. After a suitable time, e.g., 30 to 300 seconds, at about 100° to about 160° C., the mold is opened and the article removed.

Of course, other materials may be mixed or added to one or both of the reaction streams, including plasticizers, stabilizers, entenders, oils, resins, plastics, elastomers, tars, asphalts, pigments, reinforcing agents, thixotropic agents, antioxidants, mold release agents, etc. In addition various kinds of continuous stand or chopped strand glass, carbon fiber, Kevlar or a "prepreg" may be preplaced in the mold before the RIM shot.

The following example is given to illustrate the use of the instant rapid curing epoxy compositions in a RIM process. It is understood that the example is an embodiment only and is given for the purpose of illustration and the invention is not to be regarded as limited to any specific components and/or specific conditions recited therein. Unless otherwise indicated, parts and percentages in the example, are parts and percentages by weight.

Epoxy Resin A is a liquid glycidyl polyether of 2,2-bis(4-hydrophenyl)propane having an epoxide equivalent weight of 175-190 and an average molecular weight of about 350.

Epoxy Resin B is a liquid glycidyl polyether of hydrogenated 2,2-bis(4-hydroxyphenyl)propane having an epoxy equivalent weight of about 234 and an average molecular weight of about 568.

PACM-20 is a 100% isomeric mixture of 4,4'-di(cyclohexylamino) methanes containing 20% of the trans, trans-isomer; the mixture may be made by hydrogenation of methylene dianiline.

V-140 is a commercial long chain amidoamine derived by reacting a partially dimerized $C_{18}$ unsaturated straight chain fatty acid and a polyamine.

PEG-400 is a polyethylene glycol having an average molecular weight of about 400.

EXAMPLE I

An Accuratio reaction injection molding (RIM) machine equipped with a Cincinnati Millacron variable ratio mixing head, a stainless steel mold consisting of a fan-shaped spreader section and a 9"×11"×⅛" plate mold, and two 5-gallon stainless steel vessel (pots) equipped with stirrer and nitrogen and vacuum lines were employed.

Into one vessel (Vessel A) were charged 7853 grams of Epoxy Resin A and 4300 grams of styrene. Into the other vessel (Vessel B) were charged 4014 grams of PACM-20 and 4300 grams of styrene. Both vessels were stirred at ambient temperature for 20 minutes after vacuum and nitrogen passage. The RIM machine was cycled at low pressure for thirty minutes and then 1100 grams of styrene in which 120 grams of Lupersol 256, 90 grams of $Ca(NO_3)_2.4H_2O$ and 80 grams of PEG 400 were added to Vessel A. Low pressure circulation was continued for another 30 minutes. The RIM machine was adjusted to provide a weight ratio of components from Vessel A to Vessel B of 2.98:1.00.

The mold was filled with an overflow vessel and evacuator and heated to 65° C. The RIM machine was operated to produce a 1.55 second shot of the above A/B blend into the mold. The pressure on the A side was about 600 psi and on the B side, about 1,000 psi.

The molded part was held at 65° C. for one hour. Then the temperature of the mold was raised to 140° C. over an hour period and allowed to cool.

The molded specimen (Specimen A) had the following composition:

| Components | Parts by Weight |
| --- | --- |
| Epoxy Resin A | 100 |
| Styrene | 100 |
| Lupersol 256 | 1.5 |
| PACM-20 | 29 |
| $Ca(NO_3)_2.4H_2O$ | 1.0 |
| PEG-400 | 1.0 |

The above procedure was essentially repeated except that no $Ca(NO_3)_2.4H_2O$ and no PEG-400 was added to the formulation. The resulting molded specimen is hereinafter referred to as Specimen B.

The properties of the molded specimens are as follows:

| | Specimen | |
| Physical Properties | A | B |
| --- | --- | --- |
| HDT, °C. | 91 | 83 |
| Elongation to Break, % | 3 | 2.2 |
| Tensile yield, psi | 9,050 | 6,300 |
| Young's Modulus, psi | 457,000 | 381,000 |
| Shear Modulus via Rheometric Force Torsion, psi | 156,000 | 129,000 |
| Retention of Shear Modulus @ 70° C., % | 80 | 66.2 |
| Izod (Notched) ft-# | 0.44 ± 0.02 | 0.31 ± 0.12 |
| Impact (Charpy) ft-# | 0.34 ± 0.12 | 0.99 ± 0.40 |
| Impact (Rheometric Instrumental impact) ft-# | 24 | 8 |

EXAMPLE II

The procedures of Example I were essentially repeated wherein the styrene was a blend of styrene and divinyl benzene on a 83:17 weight basis and the Lupersol 256 was reduced to 1.2 pbw from 1.5 pbw.

The cured molded specimen exhibited the following physical properties:

| | |
| --- | --- |
| HDT, °C. | >100 |
| Shear Modulus, psi | 145,000 |
| Retention of Shear Modulus, % | 92 |
| Instrumental Impact, E in-ft-# ~2000 inches/minute impact velocity | 7 |

EXAMPLE III (RRIM)

Using Accuratio Micro RIM-II equipment, the Resin (A) and Curative (b) reservoirs were charged, respectively, with ~4000 of the following mixtures [Theoretical Mix Ratio=3.7 (w/w).

| A (Res. T ~56° C.) | B (Res. T = 58° C.) |
| --- | --- |
| 100 g Epoxy Resin A | 28 g PACM-20 |
| 43 g Styrene | 10 g Nonyl phenol |
| 1.0 g PEG-400 | 2 g Trimethylolpropane-trimethacrylate (TMPTMA) |
| ≦1.4 g $Ca(NO_3)_2.4H_2C$ | |
| 1.0 g t-BuPerbenzoate | |
| 1.0 g NP (Nonyl Phenol) | |

These components were processed by RRIM techniques using mix ratios of A:B of ~4.0-4.7 A to 1.0 of B and mold temperatures of 130° to 150° C. with in-mold times of 2 to 4 minutes. Continuous glass fabric (2 ply of preform triaxial glass mat and 2 ply of OC 8610 continuous strand glass mat) weighing ~200 g was placed in a 12×12 plaque mold and the above system was injected into the mold. A plaque made at 4.65 mix ratio was molded for 2 minutes at 148° C. with 15 psi back pressure on the mold after injection. The properties of this plaque were determined as follows:

| | |
| --- | --- |
| Elong to Brk. % | 2.1 |
| Ult. Tens, psi | $22.3 \times 10^3$ |
| Tens. Modulus, psi | $1.44 \times 10^6$ |
| Impact (Instrumental), in lb at 5 mi/hr | 84 |

| | |
|---|---|
| Flexural Strength, psi | $2.6 \times 10^3$ psi |
| Flexural Modulus, psi | $1.6 \times 10^6$ psi |

EXAMPLE IV

Using the same equipment as that of Example III, the following compositions were charged, respectively, to the A and B reservoirs of the RIM machine. About 4000 g of material was charged to each reservoir.

| A (Res T ~45–50° C.) | B (Res T = 30° C.) |
|---|---|
| 100 g Epoxy Resin A | 28 g PACM-20 |
| 43 g Styrene | 2.0 g TMPTMA |
| ≦1.4 g Ca(NO$_3$)$_2$·4H$_2$O | |
| 1.0 g PEG-400 | |
| 1.0 g t-Bu Perbenzoate | (Theoretical Mix Ratio = 4.9) |

These mixtures (A and B) were processed by RIM techniques at a Mix Ratio of 5.4 and 3 plaques (A, B, C) were molded as shown. The mechanical physical properties are tabulated below:

| | Plaque: | | |
|---|---|---|---|
| | A | B | C |
| | | Min/°C.: | |
| Properties | 4'/145° C. | 4'/132° C. | 2'/150° C. |
| Flexural Strength, | | | |
| MPa | 278 | 268 | 203 |
| (psi) | 40,300 | 38,900 | 29,400 |
| Flexural Modulus | | | |
| MPa | 13,000 | 13,200 | 11,800 |
| (psi) | 1,885,000 | 1,914,000 | 1,711,000 |

What is claimed is:

1. A rapid curing, storage stable, thermosetting composition, especially suitable for use in reaction injection molding processes comprising
   (1) an epoxy compound containing more than one vicinal epoxy group,
   (2) a miscible amount of at least one ethylenically unsaturated aromatic monomer,
   (3) a curing amount of at least one amino compound containing at least three amino hydrogens,
   (4) a catalytic amount of lithium or calcium nitrate, and
   (5) From about 0.1 to about 3 parts by weight of a polyalkylene ether glycol per 100 parts by weight of epoxy compound.

2. The composition of claim 1 wherein the epoxy compound is a glycidyl polyether of a polyhydric phenol.

3. The composition of claim 2 wherein the epoxy compound is a glycidyl polyether of 2,2-bis(4-hydroxyphenyl)propane.

4. The composition of claim 2 wherein the epoxy compound is a blend of (a) a glycidyl polyether of 2,2-bis(4-hydroxyphenyl)propane and (b) a glycidyl polyether of hydrogenated 2,2-bis(4-hydroxyphenyl)propane.

5. The composition of claim 1 wherein the weight ratio of the epoxy compound to the ethylenically unsaturated monomer is from about 100:10 to about 100:200.

6. The composition of claim 1 wherein the ethylenically unsaturated monomer is styrene.

7. The composition of claim 1 wherein the amino compound is a cycloaliphatic amine.

8. The composition of claim 7 wherein the cycloaliphatic diamine is hydrogenated methylene dianiline.

9. The composition of claim 7 wherein the cycloaliphatic diamine is 1,2-diaminocyclohexane.

10. The composition of claim 1 wherein the amino compound is a polyamide.

11. The composition of claim 10 wherein the polyamide is an adduct of a polymeric fatty acid and triethylamine tetramine or diethylene triamine.

12. The composition of claim 1 wherein the catalyst is Ca(NO$_3$)$_2$.

13. The composition of claim 1 wherein the melt salt is LiNO$_3$.

14. The composition of claim 1 wherein the polyalkylene ether glycol is a polyethylene glycol.

15. The composition of claim 13 wherein the polyethylene glycol has an average molecular weight of from about 200 to about 600.

16. The composition of claim 1 wherein the catalyst is employed in amounts from about 0.05 to about 5.0 parts per 100 parts by weight of epoxy compound.

17. The composition of claim 1 wherein the weight ratio of catalyst to polyalkylene ether glycol is from about 1:1 to about 1:5.

* * * * *